United States Patent [19]

Doty

[11] Patent Number: 4,958,853
[45] Date of Patent: Sep. 25, 1990

[54] SAFETY BELT WITH HIGH LOAD INDICATOR

[75] Inventor: Gerald A. Doty, Crown Point, Ind.

[73] Assignee: Gateway Industries, Inc., Olympia Fields, Ill.

[21] Appl. No.: 301,161

[22] Filed: Jan. 24, 1989

[51] Int. Cl.⁵ .............................................. B60R 22/12
[52] U.S. Cl. ................................... 280/801; 297/472; 116/203
[58] Field of Search .............. 280/801, 802, 806, 808; 297/385, 386, 389, 471, 472; 116/203; 188/371, 376

[56] References Cited

U.S. PATENT DOCUMENTS

| | | | |
|---|---|---|---|
| 2,475,588 | 7/1949 | Bierman | 244/122 |
| 3,322,163 | 5/1967 | Hughes | 139/383 |
| 3,424,495 | 1/1969 | Cherup | 297/386 |
| 3,464,459 | 9/1969 | Ballard | 139/383 |
| 3,530,904 | 12/1970 | Ballard | 139/383 |
| 3,550,956 | 12/1970 | Lowe | 297/385 |
| 3,550,957 | 12/1970 | Radke | 297/472 |
| 3,756,288 | 9/1973 | Seo et al. | 139/383 R |
| 3,807,798 | 4/1974 | Mattson | 297/386 |
| 3,823,748 | 7/1974 | Allman et al. | 139/383 R |
| 3,861,744 | 1/1975 | Yamada et al. | 297/386 |
| 3,872,895 | 3/1975 | Takada | 139/383 R |
| 3,891,272 | 6/1975 | Takaja | 297/472 |
| 3,897,106 | 7/1975 | Takada | 297/389 |
| 3,926,227 | 12/1975 | Takada et al. | 139/383 R |
| 3,970,329 | 7/1976 | Lewis | 297/471 |
| 4,004,616 | 1/1977 | Andronov et al. | 139/383 R |
| 4,278,043 | 7/1981 | Heath | 280/801 |
| 4,371,193 | 2/1983 | Takda | 280/806 |
| 4,387,911 | 6/1989 | Takada | 280/802 |
| 4,457,251 | 7/1984 | Weman et al. | 297/472 |
| 4,741,574 | 3/1988 | Weightman et al. | 280/801 |
| 4,796,917 | 1/1989 | Miller | 280/801 |

*Primary Examiner*—Richard A. Bertsch
*Attorney, Agent, or Firm*—Fitch, Even, Tabin & Flannery

[57] ABSTRACT

A safety belt or harness warning system generally having a laminate-like structure and positioned on the safety belt to expose an underlying one of the lamina indicative of a belt-applied stress above a predetermined stress, and further indicating a belt replacement. The preferred laminate has an underlying adhesive layer, which may be easily adhered to the belt for ease of application, and an interior layer indicating that a high stress force has been applied to the belt.

14 Claims, 2 Drawing Sheets

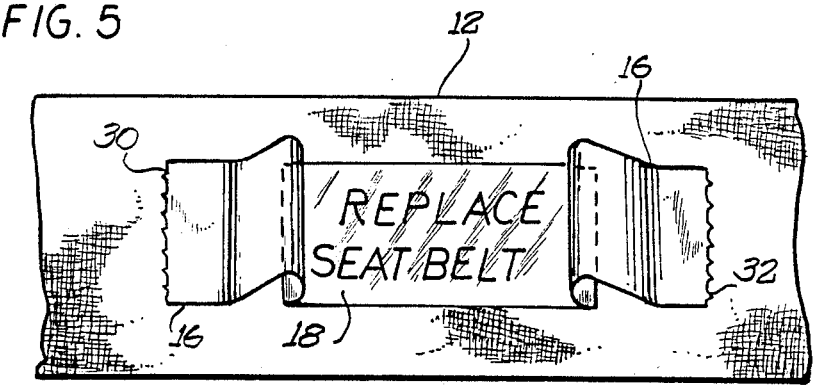
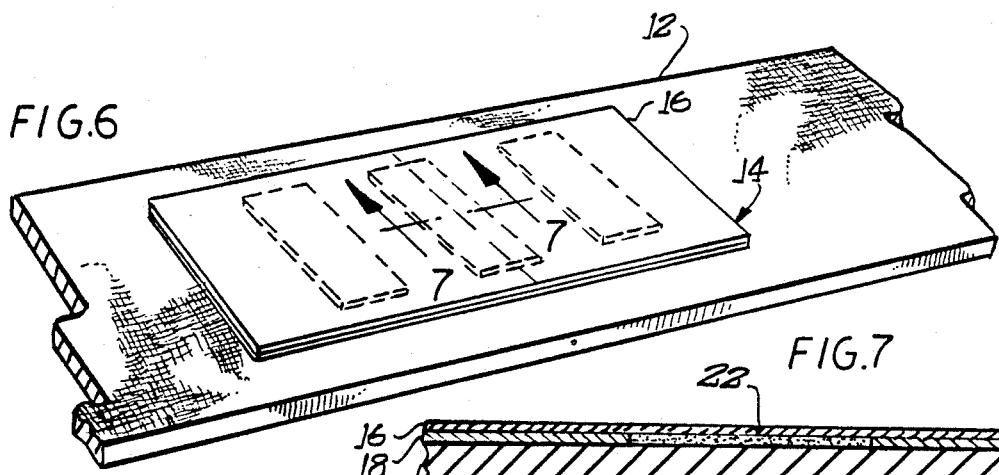
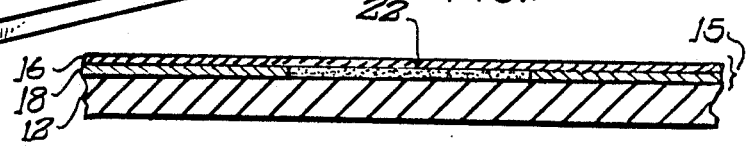
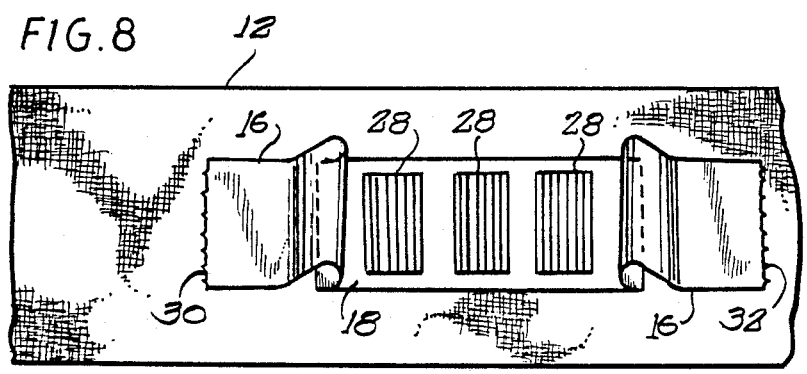

SAFETY BELT WITH HIGH LOAD INDICATOR

BACKGROUND OF THE INVENTION

The present invention generally relates to a safety belt or harness for restraining, such as that utilized in restraining aircraft passengers, automobile passengers and window washers, and more particularly, to a belt which indicates that it has been subjected to a predetermined high tensile force. In automobiles, the belts are used to restrain passenger movement during sudden deceleration of vehicles.

Safety belt and harness manufacturers generally utilize woven materials such as polyester, nylon, rayon and combinations of these fabrics. The present invention provides a means for noting to the belt user or to a repairman that the belt has experienced a tensile force above a predetermined tensile force. This warning system or indicator is desirable to indicate that the seat belt system has been subjected to extreme tensile stress, for example, when worn by a passenger during an automobile accident. This latter benefit provides a means of noting, or at least one indication of the fact, that the user may have been utilizing this belt in the prescribed manner to restrain him during an accident. Thus, the manufacturer is at least given some partial information that the belt was utilized at some point in time for restraining a wearer during a rapid deceleration, such as an accident. Also, the retractor mechanism itself may be damaged if an extremely high load had been applied during a previous accident. Hence, a warning that the seat belt system should be checked or replaced is desirable. As an attempt at providing a warning to a user, at least one manufacturer of a belt apparatus provides multicolored threads within the belt warp or weft. In this fabric each of the several colors are indicative of threads of varying tensile strength, which threads, when ruptured, expose frayed ends indicating the degree of stress and the fact that the belt no longer has all of its original stress and elongation characteristics.

Warning means provided by various belt suppliers are not considered adequate for present safety belt arrangements, especially in automotive vehicles. It has been suggested to fold over a portion of a seat belt and sew the folded over portion with thread, which will break at a predetermined load. Within the fold may be a warning label that the belt should be replaced, and when the stitches are broken, the fold is unfolded to expose the warning. This unfolding results in increased belt length at the time of an accident. The increased belt length is undesirable because it allows the wearer to move forward before being restrained. The sewing must be done at a location where there are sewing machines and, once done, the belt having the folded loop must be of a particular length. It is more desirable to be able to provide long rolls or lengths of belt and then cut them to the desired length for a particular vehicle with a retractor and belt assembly. Further, the added cost of a sewing operation and the folded belt length, which is not used until the stitches are broken, increases the cost of this system.

The present warning system provides an improved and less costly means for noting a highly stressed condition of the belt, which is less likely to be questioned should the issue of belt extension and operability arise either from liability or when a belt is noted for replacement during repair work.

BRIEF SUMMARY OF THE INVENTION

The present invention provides a safety belt with a high load indicator for use in passenger restraints in vehicles, airplanes and the like. The belt with a high load indicator preferably is constructed of a laminate arrangement with an indicator or warning label and an overlayment secured on the belt. The overlayment is operable to split, separate or otherwise uncover the warning label after the belt has been exposed to a stress above a predetermined stress, which is considered to be a belt stress limit indicative of the desirability of replacing the belt. The indicator label would contain any of several of which, each message is indicative of the fact that the belt has been highly stressed and probably should be replaced. Further, this warning could be an alternative coloration or other label-like arrangement indicative of required belt replacement. Alternative embodiments illustrate that the label need not be of a particular structure but may include arrangements such as direct interwoven stitching or stencilling on such belt or harness with the overlayment again secured to disguise or conceal the warning until such high stress results in belt elongation beyond a predetermined limit.

BRIEF DESCRIPTION OF THE DRAWINGS

FIG. 5 is a plan view of a laminate warning structure of FIG. 1 with the overlayment separated to expose the warning label;

FIG. 6 is a perspective view with an alternative warning label in dashed outline;

FIG. 7 is a cross-sectional view along the line 7—7 of FIG. 6; and

FIG. 8 is the exposed embodiment of FIG. 6 with the overlayment separated to expose the warning means.

DETAILED DESCRIPTION OF THE INVENTION

Figure 1:
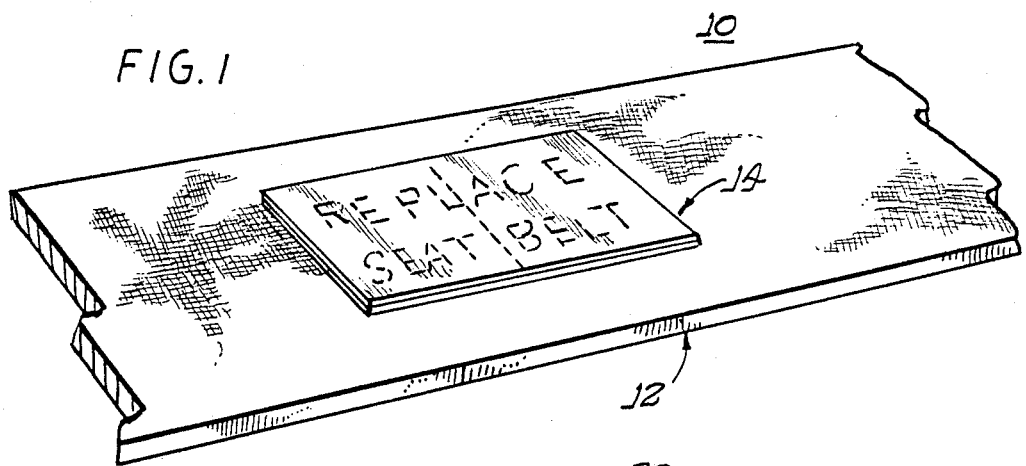
FIG. 1 is a perspective view of a warning label laminate positioned on a belt surface with an exemplary warning in dashed outline.
Figure 3:
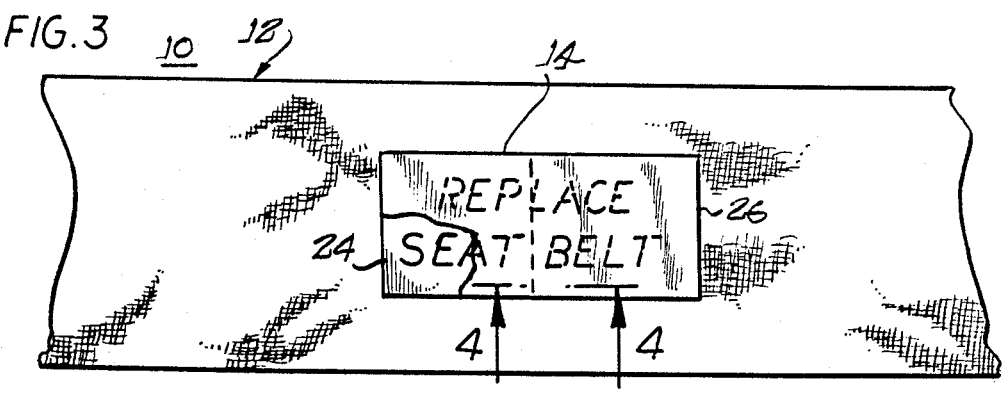
FIG. 3 is a plan view of the laminated structure of FIG. 1 on a belt with a partial section of an overlayment.

The present invention provides a safety belt assembly 10, as shown in FIGS. 1 and 3, which assembly 10 includes a belt 12 and an indicating or warning system 14 affixed thereto. Belt 12 may be of any structure, but it is preferably of a polyester woven material. Alternatively, safety belts or harnesses have been constructed of materials such as nylon, rayon, polypropylene, high strength cotton and other such yarns and fabrics. These belt structures may be multi-laminate materials rather than single layer structures.

It is desirable to provide an indication that the belt and/or a seat belt retractor 44 or other components have been highly stressed, such as from an accident. During an automobile accident, the person's body applies high loads, particularly at sudden impacts at high vehicle speeds, to the belts. Seat belt systems are often tested at 2500 to 3000 pounds of tensile load applied to the belt. The usual pawl-and-ratchet mechanisms may deform at such high loads and should be replaced. Usually, the loads applied to a belt by a person are much less than this at the time of an accident, and it still may be desirable to replace the belts, retractors or buckles, as a safety precaution, when they have been subjected to lesser loads such as 600 pounds or 1000 pounds. The indicator or warning system should be operable at whatever is chosen as the predetermined load. Also, persons may falsely claim to have worn their seat belts at the time of an accident, but if the indicator is not broken, it may provide evidence that the belt was not worn, as the load indicator has not been rendered effective.

In accordance with the present invention, a seat belt indicator or warning system 14 is inexpensively formed and attached to a seat belt 12, preferably by adhering a laminate 15 to the belt with one of the lamina fracturing at a predetermined tensile load to expose an indication or warning of a highly-stressed belt. The preferred laminate is secured by an adhesive layer to the seat belt 12. As the belt elongates from the load thereon, the laminate is also elongated, and at elongation beyond the laminate rupture point, at least one of the lamina fractures and exposes the highly-stressed indication or warning. As explained below, the illustrated laminate has an outer layer or overlayment 16, which fractures to expose an underlying layer or label 18 bearing the warning message of "replace seat belt." Preferably, there is a differential resistance to expansion or elongation with force between the inner and outer layers of the laminate, and, the outer layer fractures as it is extended with the belt from applied tensile forces that elongate the outer layer beyond its breaking point.

Figure 4:
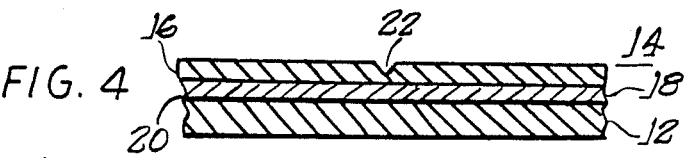
FIG. 4 is a sectional view along the line 4—4 of FIG. 3.

Referring now in greater detail to the invention and to FIG. 4, the warning system 14 is shown in partial cross-section along the line 4—4 of FIG. 3. Warning system 14 is illustrated as a laminate structure with overlayment 16, mounted on warning label 18, and having adhesive or securing layer 20 interposed between belt 12 and warning label 18. Thus, the laminate structure, which may be a subassembly, is mounted on belt 12 and secured by adhesive layer 20. The use of an adhesive is merely illustrative and not a limitation.

As shown, label 18 is interposed between overlayment 16 and belt 12; and in this arrangement, overlayment 16 conceals or disguises label 18, which bears a message indicative of a highly stressed belt or belt replacement requirements. In this structure, overlayment 16 is provided with a notch 22, which provides a weak point for ease of separation of such overlayment from the warning label 18. Overlayment 16 in this illustration is not secured to the warning label in its entirety, but is bonded to label 18 or the label surface at selected points, thus permitting separation of overlayment 16 from warning label 18 to expose the underlying message. As an example, overlayment 16 in FIG. 3 may be secured at the longitudinal outer edges 24 and 26 of the label 18. Overlayment 16 is shown in FIG. 5 in its separated mode, thus exposing the underlying label 18 and its message.

The alternative embodiment in FIG. 6 illustrates overlayment 16 mounted over label or message-bearing structure 18 on belt 12. In this embodiment, the warning message or structure 14, illustrated in FIG. 8, comprises a series of three broad bands 28. These bands 28 are integral with label 18 and are indicative of a highly stressed or elongated belt 12, which requires replacement thereof. The edges 30 and 32 of overlayment 16, which are noted in both FIGS. 5 and 8, have a serrated edge. The serrated edging is merely exemplary of the type of a separating means, which allows overlayment 16 to disengage from label 18 and expose the message on label 18.

Figure 2:
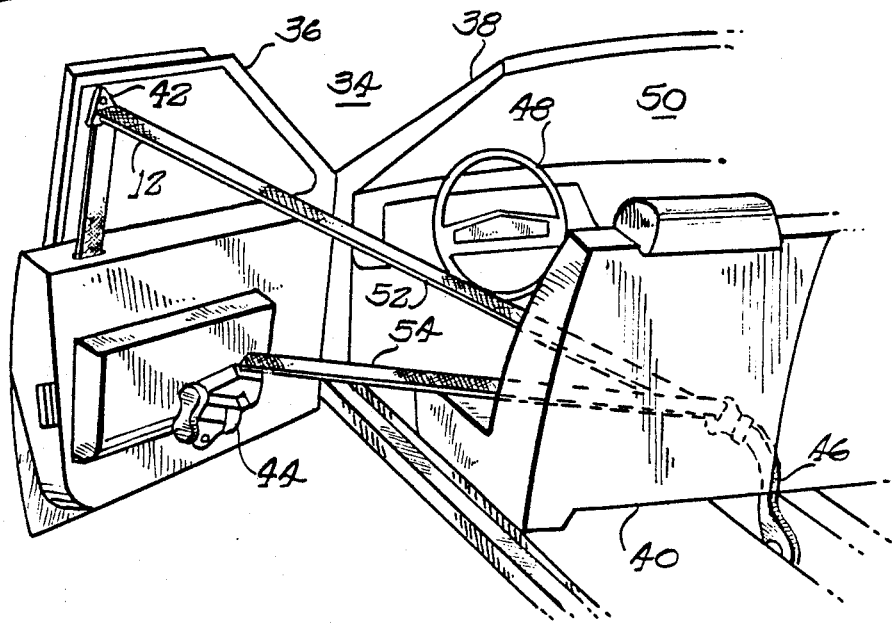
FIG. 2 illustrates a belt and harness restraint assembly in a passenger vehicle.

In FIG. 2, an automobile with a seat belt assembly is illustrated. In this Figure, vehicle 34 includes a door 36, frame 38, and a seat 40. Belt 12 is illustrated as secured to a bracket 42 on the door frame with a retractor 44 likewise mounted on the door, and a floor-mounted bracket 46 located along the longitudinal center of the vehicle. Bracket 46 may be operable to receive either a belt clip in a fixed slot or to receive a buckle slidable along the belt 12 and operable to be clipped or secured to the mounting bracket 46. A passenger is secured by belt 12 in seat 40 and restrained from being thrown forward either into the steering wheel 48 or the windshield 50 of the vehicle upon impact of a collision or rapid vehicle deceleration. The illustrated belt arrangement provides both a shoulder and lap harness, that is, seat belt 12 secures the passenger in his seat across his waist or lap with lap belt 54, and diagonally across his body and shoulder with shoulder belt 52.

Belt 12 is operable to secure a passenger in seat 40. Thereafter, during impact, rapid deceleration or other stress-inducing condition, belt 12, if secured in its operating mode, will experience a tensile force while restraining the passenger in his seated position. The applied force elongates belt 12, which elongation may or may not be recoverable after relief of the tensile force. Belt elongation from an applied tensile force beyond a predetermined force (a yield point) may not be recoverable, which would render the belt potentially inadequate to restrain the passenger at a second or later applied stress. The present invention provides a means to alert the user or repairman that belt 12 has been stressed above a predetermined force, as the belt extends in length sufficient to break the laminate. In this case, the inner layer, which is intimately bonded to the belt, should not tear with belt elongation, while the weaker outer layer tears or fractures.

In another or second alternative embodiment, the label may, in fact, be provided as a stencil message on belt 12 with overlayment 16 directly secured to belt 12. The warning message could also have been stitched into the fabric of the belt and overlayment 16 again directly secured to belt 12. Overlayment 16 and the underlying message, whether a label, stencil or sewn message, should be operable and pliable to be rewound on a retractor mechanism. Although this is not a requisite property, it is desirable to care for the warning message.

Overlayment 16 may be of any material adequate to cover this label. However, overlayment 16 may be separable either at a predetermined weak point, such as a perforation or serrated edges 30, 32 along its midpoint, or the overlayment 16 may have a tensile strength adequate to separate at a predetermined stress. The stress load is applied to the belt at an impact, deceleration, or collision, thus elongating belt 12, when utilized in its functional mode. This stress and elongation are communicated or transferred to overlayment 16, thus elongating overlayment 16 to its rupture limit to thereby expose the underlying message on label 18 as shown in FIG. 5.

The laminate may be easily applied, such as by a heated pad which applies heat and pressure to activate the adhesive and to bond the laminate to the porous belt structure. Such equipment to apply the laminate is easily portable and may be used and deployed at the location where a belt is cut to length for the particular safety harness. The laminate and its application provide a quick, easy and inexpensive system for high load indication.

While only specific embodiments of the invention have been described and shown, it is apparent that various alterations and modifications can be made therein. It is, therefore, the intention in the appended claims to cover all such modifications and alterations as may fall within the scope and spirit of the invention.

What is claimed is:

1. A seat belt for restraining a passenger in a vehicle and having a force indicator, said belt comprising:
   a strap of a woven fabric having a predetermined fixed length, which fabric elongates at a belt-applied tensile stress, said belt length increasing from said fixed length only due to elongation of the fabric under tensile loads applied thereto;
   a laminate for informing a user of belt elongation beyond a predetermined elongation of the belt; said laminate having a means for indicating an applied force above a predetermined level and an outer, relatively frangible layer; a means for securing said laminate to said belt; said laminate mounted on said belt and secured thereon by said securing means; said relatively frangible outer layer having a tensile strength to rupture at a predetermined elongation of the fabric of said strap to expose said underlying label and inform a user that the strap has been stressed by a tensile load at least equal to a predetermined stress level correlative to said predetermined elongation.

2. A seat belt in accordance with claim 1 in which said means for securing the laminate to the belt comprises an adhesive layer on the laminate for adhering to the belt.

3. A seat belt in accordance with claim 2 in which the means for indicating a force above a predetermined level comprises an interior layer between the adhesive layer and outer layer.

4. A seat belt in accordance with claim 3 in which a printed message is on said interior layer.

5. An indicator system for a belt in a passenger restraint assembly, which assembly includes a retracting and buckling means, said belt and restraint assembly operable to secure a passenger in position against an applied stress, said warning system comprising:
   a belt having a predetermined fixed length, which belt is a material that elongates in response to an applied force; said belt increasing in length from said fixed length only by material elongation;
   a label mounted on said belt, which label is indicative of replacement of said belt; and,
   an overlayment mounted on and concealing said label, said overlayment operable to separate from and expose said label at a belt elongation and increase in length correlative to a belt-applied force above a predetermined force.

6. A warning system for a belt as claimed in claim 5 wherein said belt is a fabric material with an elastic limit stress and said belt elongation from an applied force is nonrecoverable above said elastic limit; said predetermined force being less than said elastic limit stress.

7. A warning system as claimed in claim 5, which warning system is a laminate structure comprising said belt; an adhesive layer positioned on said belt; said label mounted on said adhesive layer; and, said overlayment secured on said label, which overlayment is operable to disengage from and expose said label at said predetermined force.

8. A warning system as claimed in claim 7 wherein said label and overlayment cooperate to define an assembly, which assembly is mounted on said adhesive layer on said belt.

9. A warning system as claimed in claim 5 wherein said label is stenciled on said belt, said overlayment is secured to said belt and conceals said stenciled label, which overlayment is operable to separate from said belt and expose said label at a belt-applied stress above said predetermined force.

10. A warning system as claimed in claim 5 wherein said label is stitched on said belt, said overlayment is secured to said belt over said stitched label, which overlayment conceals said label and is operable to separate from said belt and expose said label at a belt-applied stress above said predetermined stress.

11. A warning system as claimed in claim 5, wherein said belt is rewound on said retracting mechanism in an inoperative mode, said label and overlayment being pliable and operable to be rewound with said belt on said retracting mechanism.

12. In a vehicle safety belt system operable to restrain an occupant in a vehicle seat, the safety belt system including a safety belt, a retracting mechanism biased to rewind the safety belt on a reel, the improvement comprising:
   said belt being made of a fabric which elongates and having a predetermined fixed length and the length of the belt being increased only due to fabric elongation;
   a warning label on said belt indicating an overstressed condition in said belt; and,
   an overlayment mounted on one of said warning label and belt to conceal said label, which overlayment is responsive at a predetermined longitudinal force applied to said belt to elongate the belt sufficiently to expose said label.

13. A belt system with a warning label as claimed in claim 12 wherein said belt is wound on said retracting mechanism, said warning label mounted on said belt to be exposed and visible when a force at least equal to said predetermined force has been applied to said belt and, said overlayment is operable to separate from said label at said predetermined force.

14. A belt system with a warning label as claimed in claim 12 wherein said indicating means is pliable and operable with said belt to be wound by said retracting mechanism.

* * * * *